US012645705B2

(12) United States Patent
Jain et al.

(10) Patent No.: US 12,645,705 B2
(45) Date of Patent: Jun. 2, 2026

(54) LARGE SCALE DATA DISCOVERY WITH NEAR REAL TIME DATA CATALOGUING AND DETAILED LINEAGE

(71) Applicant: RAKUTEN SYMPHONY, INC., Tokyo (JP)

(72) Inventors: Gaurav Jain, San Mateo, CA (US); Parth Anand, Indore (IN); Phani Vaibhav Puram, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 51 days.

(21) Appl. No.: 18/264,581

(22) PCT Filed: Apr. 7, 2023

(86) PCT No.: PCT/US2023/017830
§ 371 (c)(1),
(2) Date: Aug. 8, 2023

(87) PCT Pub. No.: WO2024/210902
PCT Pub. Date: Oct. 10, 2024

(65) Prior Publication Data
US 2025/0021585 A1      Jan. 16, 2025

(51) Int. Cl.
*G06F 16/00*         (2019.01)
*G06F 16/215*        (2019.01)
*G06F 16/25*         (2019.01)
*G06F 16/28*         (2019.01)

(52) U.S. Cl.
CPC .......... *G06F 16/287* (2019.01); *G06F 16/215* (2019.01); *G06F 16/258* (2019.01)

(58) Field of Classification Search
None
See application file for complete search history.

(56) References Cited

U.S. PATENT DOCUMENTS

| | | | | |
|---|---|---|---|---|
| 7,849,050 B2 * | 12/2010 | Mangipudi | ........... | G06F 16/254 |
| | | | | 707/602 |
| 2012/0310875 A1 * | 12/2012 | Prahlad | ............... | G06F 16/2465 |
| | | | | 707/602 |
| 2014/0372588 A1 | 12/2014 | Newton et al. | | |
| 2015/0012478 A1 * | 1/2015 | Mohammad | .......... | G06F 16/254 |
| | | | | 707/602 |
| 2018/0052878 A1 | 2/2018 | Seetharaman et al. | | |
| 2020/0026710 A1 | 1/2020 | Przada et al. | | |

(Continued)

FOREIGN PATENT DOCUMENTS

| | | | | |
|---|---|---|---|---|
| WO | WO-2014151631 A1 * | 9/2014 | ........... | G06F 16/219 |

*Primary Examiner* — Bai D Vu
(74) *Attorney, Agent, or Firm* — HAUPTMAN HAM, LLP

(57) ABSTRACT

A data platform for providing large scale data discovery with near real time data cataloguing and detailed lineage. Data is received from one or more sources, and the received data is written to a data storage systems. The received data is processed at the data storage systems using sensors at the data storage systems. Metadata and data definitions associated with the data are sent to a data service in near real-time. A data catalog is generated at the data service based on the metadata and data definitions associated with the data. Data lineage for the data is created at the data service. The data catalog and data lineage are presented at a data discovery interface.

20 Claims, 9 Drawing Sheets

(56) References Cited

U.S. PATENT DOCUMENTS

| | | | |
|---|---|---|---|
| 2020/0097845 A1* | 3/2020 | Shaikh | G06Q 30/0201 |
| 2021/0349901 A1 | 11/2021 | Potharaju et al. | |
| 2023/0118563 A1 | 4/2023 | Yadav et al. | |
| 2024/0054143 A1* | 2/2024 | Vishnoi | G06F 16/2379 |
| 2024/0320234 A1* | 9/2024 | Ren | G06F 16/254 |

* cited by examiner

800

S802 — ( Start )

S810

Data From One Or More Sources Is Received

S814

The Received Data Is Written To A Data Storage Systems

S818

The Received Data Is Processed At The Data Storage Systems Using Sensors At The Data Storage System

S822

Metadata And Data Definitions Associated With The Data Are Sent To A Data Service In Near Real-Time

S826

A Data Catalog Is Generated At The Data Service Based On The Metadata And Data Definitions Associated With The Data

S830

Data Lineage For The Data Is Crated At The Data Service

S834

The Data Catalog And Data Lineage Are Presented At A Data Discovery Interface Of The Data Service

S838

Input Is Received Via The Data Discovery Interface For Querying The Metadata Associated With The Data At The Data Storage Systems

S842

A Data Set At The Data Storage Systems Is Identified By The Query Interface Based On The Input, The Metadata, And The Data Definitions

S846

Access To The Identified Data Set At The Data Storage Systems Is Requested

S850

In Response To A Grant Of Access To The Identified Data Set, The Query Interface Generates A Query For Reading The Identified Data Set Based On The Input, The Metadata, And The Data Definitions S860 — ( End )

Fig. 8

LARGE SCALE DATA DISCOVERY WITH NEAR REAL TIME DATA CATALOGUING AND DETAILED LINEAGE

RELATED APPLICATIONS

The present application is a National Phase of International Application No. PCT/US2023/017830, filed Apr. 7, 2023.

TECHNICAL FIELD

This description relates to large scale data discovery with near real time data cataloguing and detailed lineage, and method of using the same.

BACKGROUND

In an organization, there are many teams, which are generating data. To be able to take advantage of this data, a user wants to search through the available data in the enterprise. Data lineage tools show the evolution of data over time via metadata. Data lineage identifies the flow of the data. The data lineage is able to identify the creation of the data, changes made to the data, and the end target containing the data. The data lineage thus identifies where the data came from, what processes were involved in the creation of the data, who was involved in the creation and transformation, and where the data is currently located.

A Data Catalog uses the same information to create a searchable inventory of data assets in an organization. Using the data catalog and lineage enables a user to discover the data that is present in the organization. A data object has attributes, such as who is the owner, what is the structure of the data object, who generated the data object, who is consuming the data object in the downstream, and what downstream process is being used to generate the data object.

There are numerous components or products, such as Apache Atlas, that provide different aspects of data discovery, data catalogs, and lineage. Apache Atlas provides native support to Hadoop based systems. Apache Ranger™ is a framework to enable, monitor and manage comprehensive data security across the Hadoop platform. Another product is Atlan, which joins together metadata from various sources to create a unified data discovery, cataloging, lineage, and governance experience across data assets. Additional components, such as Spark, helps build the data lineage using the connector with Apache Atlas.

However, these individual components stand alone and do not provide a complete user setting, e.g., from generation of the data to generation of the data catalog to querying and returning datasets. Existing components also do not provide native integration with all tools in a data platform for helping a user make an informed business decision, do not enable visualization of complex data transformations in the lineage, or provide lineage and catalog optimization for reducing data and process duplicates to reduce resource utilization.

SUMMARY

In at least embodiment, a method for providing a data platform includes receiving data from one or more sources, writing the received data to a data storage systems, processing the received data at the data storage systems using sensors at the data storage systems, sending metadata and data definitions associated with the data to a data service in near real-time, generating, at the data service, a data catalog based on the metadata and data definitions associated with the data, creating, at the data service, data lineage for the data, and presenting the data catalog and data lineage at a data discovery interface.

In at least one embodiment, a data platform, includes a memory storing computer-readable instructions, and a processor connected to the memory, wherein the processor is configured to execute the computer-readable instructions to perform operations to receive data from one or more sources, write the received data to a data storage systems, process the received data at the data storage systems using sensors at the data storage systems, send metadata and data definitions associated with the data to a data service in near real-time, generate, at the data service, a data catalog based on the metadata and data definitions associated with the data, create, at the data service, data lineage for the data, and present the data catalog and data lineage at a data discovery interface.

In at least one embodiment, a non-transitory computer-readable media having computer-readable instructions stored thereon, which when executed by a processor causes the processor to perform operations including receiving data from one or more sources, writing the received data to a data storage systems, processing the received data at the data storage systems using sensors at the data storage systems, sending metadata and data definitions associated with the data to a data service in near real-time, generating, at the data service, a data catalog based on the metadata and data definitions associated with the data, creating, at the data service, data lineage for the data, and presenting the data catalog and data lineage at a data discovery interface.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

FIG. 8 is a flowchart of a method for providing large scale data discovery with near real-time data cataloging and detailed lineage according to at least one embodiment.

DETAILED DESCRIPTION

Figure 1:
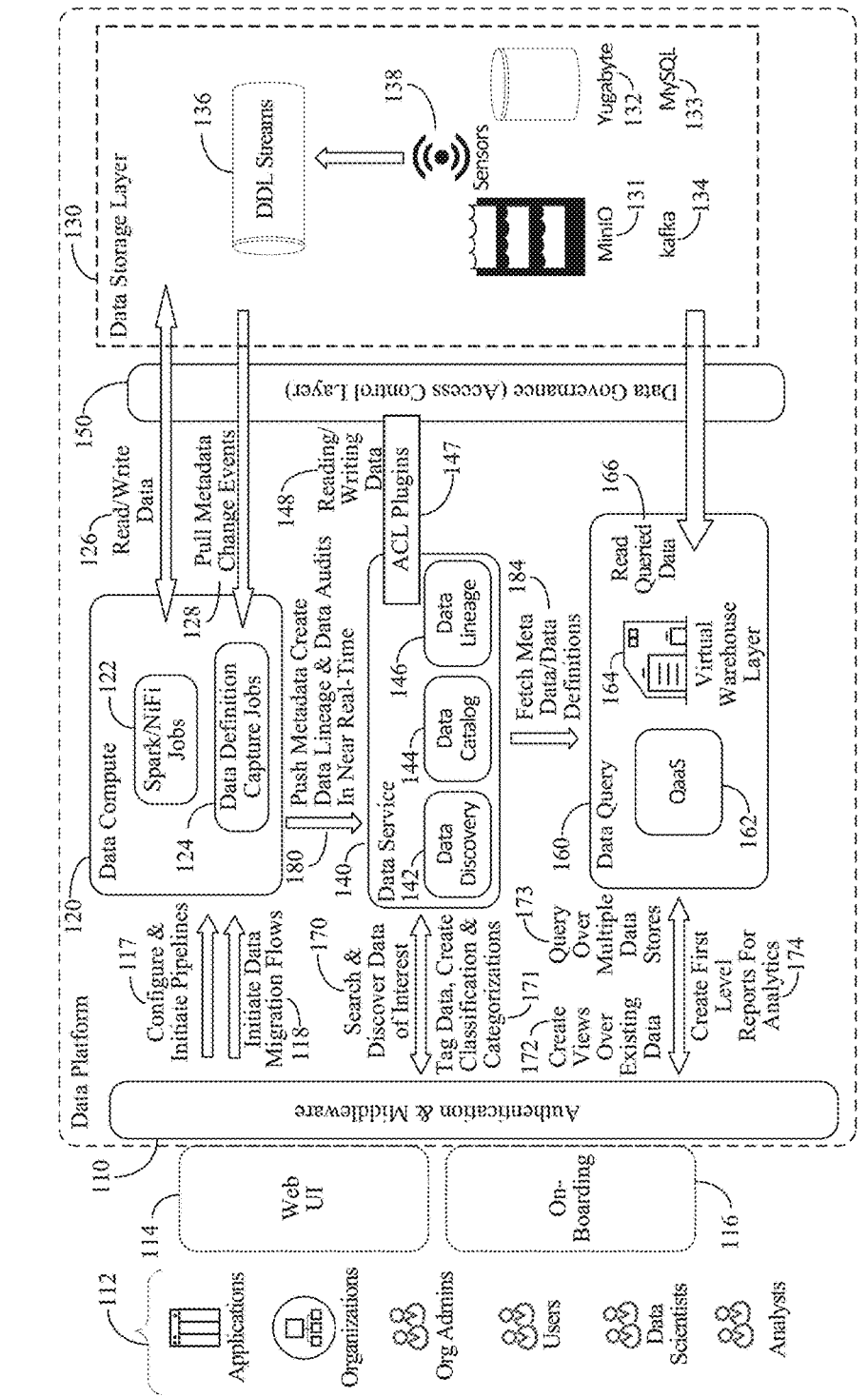
FIG. 1 illustrates a Data Platform according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, data-streams or signaling-streams. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, data-streams or signaling-streams from UE.

In at least embodiment, a method for providing a data platform includes receiving data from one or more sources, writing the received data to a data storage systems, processing the received data at the data storage systems using sensors at the data storage systems, sending metadata and data definitions associated with the data to a data service in near real-time, generating, at the data service, a data catalog based on the metadata and data definitions associated with the data, creating, at the data service, data lineage for the data, and presenting the data catalog and data lineage at a data discovery interface.

According to at least one embodiment, a data platform receives input at an Authentication and Middleware Interface from one or more sources. Data platform Data Governance, Data Storage Layer, Data Compute Interface, Data Discovery Interface, and Query Interface. A Data Compute Interface, a Data Service Interface, and a Query Interface are provided. Data Compute Interface includes a Data Generation and Transformation Layer that writes or reads data toward Data Storage Layer. Data Governance (Access Control Layer) controls access to the Data Storage Layer by determining access rights to the Data Storage Layer. New data and changes are captured by Sensors in the Data Storage Layer and are pushed to Data Compute Interface. Data Compute Interface pushes Metadata, creates Data Lineage, and performs Data Audits. This information along with data definitions are pushed to Data Service Interface. Data Service Interface includes a Data Discovery Interface and presents Data Catalog and Data Lineage. Duplicates in the Data Lineage and the Data Catalog are determined and eliminated. A user is able to search and discover data of interest across the data by accessing Data Discovery Interface at Data Service Interface. Data Compute Interface pulls Metadata Change Events. Data Lineage is created to present detailed, granular lineage information including details for use in performing complex data transformations. Data Service Interface receives input at Data Discovery Interface for querying the metadata associated with the data at the Data Storage Systems. Tag data, and Classification and Categorizations data are associated with the data. In response to a query being generated by Data Query Interface, a dataset is identified by Data Query Interface at the Data Storage Layer based on the input to Data Discovery Interface of Data Service Interface, and the metadata and the data definitions fetched from the Data Service Interface. Data Governance (Access Control Layer) controls access to the Data Storage Layer by requesting access rights to the Data Storage Layer. In response to a grant of access, a user is able to generate a query for reading the identified dataset. Data is then fetched directly from the Data Storage Layer through the Data Query Layer.

Embodiments described herein thus provide certain advantages. These advantages include one or more of providing a one-stop solution for data usage lifecycle, providing discoverability of data to end user in near real time because of the minimization of manual intervention, enabling informed business decisions to be made due to the low level lineage with detailed steps involved in data transformation and other metadata details that includes schema, provides ease of use due to automatic creation of the Data Catalog and integration with a Query Layer, or provisioning of proper data meaning and accountability. The capability for pattern detection helps any user to detect/search any data based on a type of operation (or a set of operations) that lead to the generation of a particular data. This knowledge helps users/applications avoid duplication of datasets and the operations that are used to generate them there-by reducing cost & effort for the same.

FIG. 1 illustrates a Data Platform 100 according to at least one embodiment.

In FIG. 1, an Authentication and Middleware Interface 110 receives input from one or more sources 112, for example, through a Web UI 114 and/or an Onboarding Interface 116. A Data Compute Interface 120 includes a Data Generation and Transformation Layer that writes or reads data toward Data Storage Layer 130. Configure and Initiate Pipelines 117 and Initiate Data Migration Flows 118 are configured to ingest data at Data Compute Interface 120. Data Compute Interface 120 uses Spark/NiFi Jobs 122 to process and distribute data over resources, and Data Definition Capture Jobs 124 to pull that data from stream queues. Data Compute Interface 120 is thus able to Read and Write Data 126 via Data Storage Layer 130.

Data Storage Layer 130 implements a data storage systems that stores datasets. Different data storage technologies are able to be implemented, such as MinIO 131, Yugabyte 132, MySQL 133, Kafka 134, etc. Data Definition Language (DDL) streams 136 presents data to the data storage 131-134 and Sensors 138 categorizes data into new data and changed data, and captures change information that is pushed to Data Computer Interface 120 and then to Data Service Interface 140. Data Governance (Access Control Layer) 150 controls access to the Data Storage Layer 130. Data Compute Interface 120 pulls Metadata Change Events 128 from Data Storage Layer 130.

Data Service Interface 140 presents a Data Discovery Interface 142, a Data Catalog 144, and Data Lineage 146. Access Control List (ACL) Plugins 147 provide rules that concern access to the Data Storage Layer 130 for Reading/Writing Data 148. Data Query Interface 160 includes Query-as-a-Service (QaaS) 162 to enable users to process and query data. Virtual Warehouse Layer 164 provides an abstracted view of the data at the data storage as well as tools and APIs to extract data.

A user that wants to Search and Discover Data of Interest 170 across the data accesses Data Discovery Interface 142 at Data Service Interface 140. Users who are Data Owners are able to Tag Data, and Create Classification and Categorizations 171 associated with the data. Data Query Interface 160 is able to Create Views Over Existing Data 172 and supports Queries Over Multiple Data Stores 173. Create First Level Reports For Analytics 174 is associated with the dataset identified at the data storage is able to be created based on a query.

Data Compute Interface 120 pushes Metadata and Creates Data Lineage and Data Audits 180 towards Data Service Interface 140. In at least one embodiment, the metadata and data definitions associated with the data received from the one or more data storage systems are provided to Data Service Interface 140 in near real-time. Those skilled in the art recognize that non-real-time refers to a response time of 1 second or more and near real-time refers to responses down to 10 milliseconds (ms). Data Query Interface 160 fetches Metadata and Data Definitions 184 from Data Service Interface 140. Based on approved queries, Data Query Interface 160 can receive Read Query Data 166 for reading FIG. 2 illustrates processes of the data platform 200 according to at least one embodiment.

Figure 2:
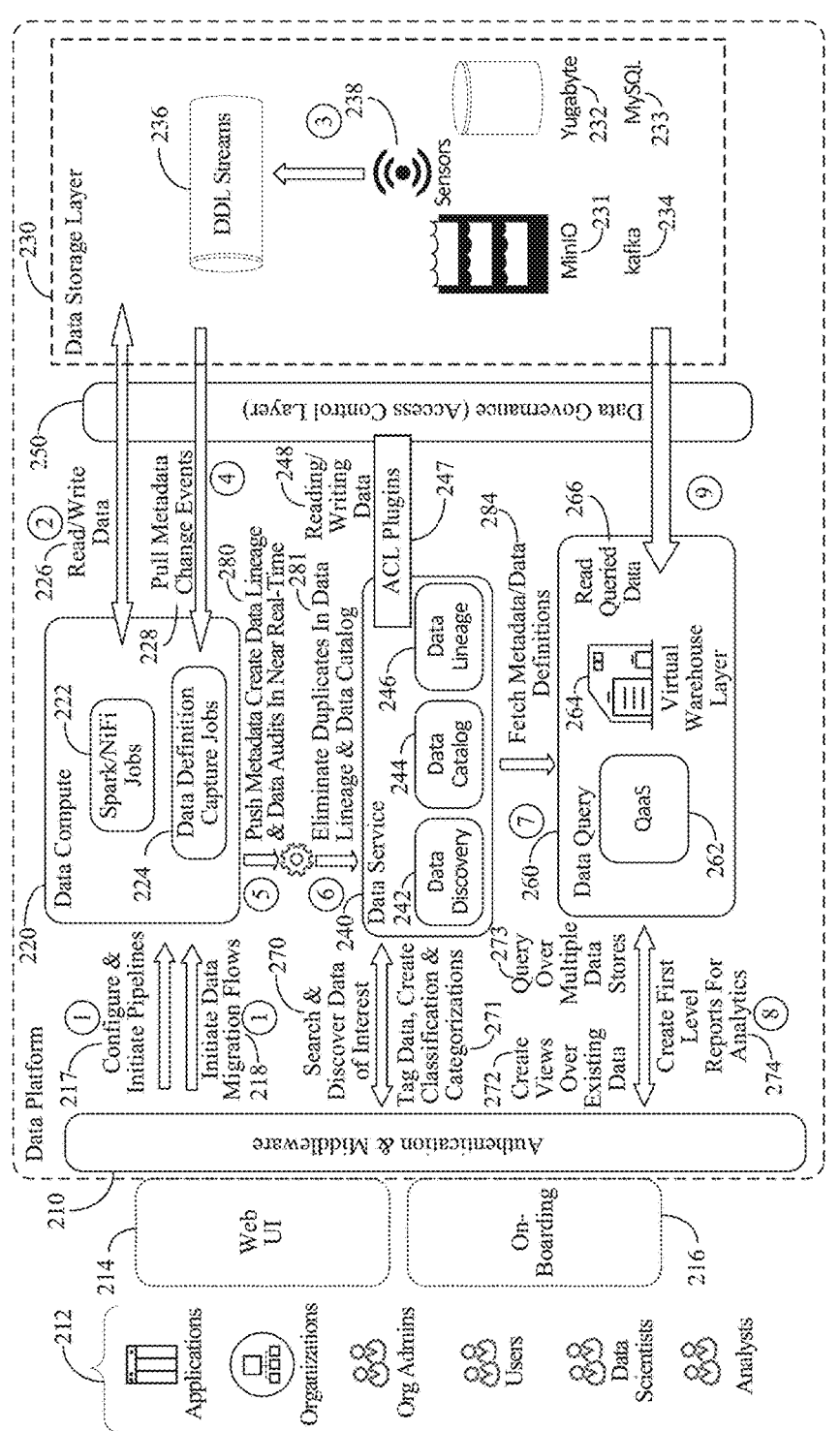
FIG. 2 illustrates processes of the data platform according to at least one embodiment.

In FIG. 2, an Authentication and Middleware Interface 210 receives input from one or more sources 212, for example, through a Web UI 214 and/or an Onboarding Interface 216. A Data Compute Interface 220 includes a Data Generation and Transformation Layer that writes or reads data toward Data Storage Layer 230. Data Governance (Access Control Layer) 250 controls access to the Data Storage Layer 230 by determining access rights to the Data Storage Layer 230.

At "1", Configure and Initiate Pipelines 217 and Initiate Data Migration Flows 218 are configured to ingest data into data sources in Data Storage Layer 230 where Sensors 238 capture these changes. Data is provided to Data Compute Interface 220. Data Compute Interface 220 includes a Data Generation and Transformation Layer that writes or reads data toward Data Storage Layer 230.

Data Compute Interface includes Spark/NiFi jobs 222 and Data Definition Capture Jobs 224 to pull that data from stream queues. Data Definition Capture Jobs 224 include preconfigured jobs for the capture of data definition that pull data from the stream queue. Data Definition Capture Jobs 234 extract information and convert it to unified format which Data Discovery Interface 224 of Data Service Interface 240 understands.

At "2" data is Read and Written 226 to Data Storage Layer 230 by Data Compute Interface 220. Data Storage Layer 230 includes multiple data storage systems that stores datasets. Different data storage technologies are able to be implemented, such as MinIO 231, Yugabyte 232, MySQL 233, Kafka 234, etc. Data Storage Layer 230 stores datasets using Data Definition Language (DDL) streams 236. DDL is a subset of SQL that is a language for describing data and its relationships in a database, e.g., MinIO 231, Yugabyte 232, etc. ACL Plugins 247 provide rules that concern access to the Data Storage Layer 230 for Reading/Writing Data 248. Query Interface 360 includes Query-as-a-Service (QaaS) 262 to enable users to query data. Virtual Warehouse Layer 264 provides an abstracted view of the data at the data storage as well as tools and APIs to extract data.

At "3", Sensors 238 are written for the database that categorizes data into new data and changed data, and captures change information that is pushed to Data Compute Interface 220 and then to Data Service Interface 240. Sensors 238 detect changes in data and then push the changes to the Data Compute Interface 220 and then to Data Service Interface 240. For example, a file that is written to the database, and Sensors 238 sends the file to Data Compute Interface 220. Metadata Capture Services pull these and create Data Catalog 244 and Data Lineage 246. Data Lineage 246 is created to present detailed, granular lineage information including details such data classifications and business topology that are tagged to the metadata for use in performing complex data transformations.

At "4", Data Compute Interface 220 pulls Metadata Change Events 228.

At "5", Data Compute Interface 220 pushes Metadata Create Data Lineage and Data Audits 280 towards Data Service Interface 240 in near real-time. Data definitions are also able to be provided by Data Compute Interface 220 to Data Service Interface 240.

Data Service Interface 240 includes a Data Discovery Interface 242 and presents Data Catalog 244 and Data Lineage 246. In response to the file being generated from an already existing file, Data Lineage 246 is captured that identifies the file as being derived from the earlier existing file. Metadata Information 280 is presented by Data Compute Interface 220 to Data Service Interface 240 in unified discovery format that is then provided to duplication sensor.

At "6", duplicates in the Data Lineage and the Data Catalog 281 are eliminated. New data paths that share the same jobs are added to Data Lineage 246 and the data paths are associated under one Data Catalog 244 based on the metadata and data definitions. The Data Catalog 244 presents catalogues related information, such as lineage, data path, owner, data description, etc. in Data Discovery 242.

A user is able to Search and Discover Data Of Interest 270 across the data by accessing Data Discovery Interface 242 at Data Service Interface 240. Data Lineage and Data Audit 280 are pushed from Data Compute Interface 220 to Data Service Interface 240. Data Service Interface 240 receives input for querying the metadata associated with the data at the data storage systems. Tag Data, and Created Classification and Categorizations 271 are associated with the data.

Data Query Interface 260 is able to Create Views Over Existing Data 272 and supports Queries Over Multiple Data Stores 273. Data Service Interface 240 includes the data definitions that are provided to Data Query Interface 260.

For Data Catalog 244 or a Data Object being pushed into Data Service Interface 240, the data is optimized before the Data Catalog 244 is created. For example, one or more users try to process the same data twice. An existing pipeline that is used to create a compute job to write data is able to exist while a second pipeline associated with the same data is created. However, one Data Lineage 246 is created. Data Discovery Interface 242 determines that data already exists in the storage system 231-234 and the Data Storage Layer 230 does not create anything new again.

At "7", for a Data Catalog 244, metadata and data definitions are fetched form Data Service Interface 240. Data Query Interface 260 fetches the Metadata Definitions 284 from Data Service Interface 240 and generates corresponding tables or views. Data Query Interface 260 implements applications that are used to search the Data Storage Layer 230 across the Data Catalog 244. Users can also query any Data Catalog 244 via Data Query Interface 260. When a query is generated by Data Query Interface 260, a dataset is identified by Data Query Interface 260 at the Data Storage Layer 230 based on the input to Data Discovery Interface 242 of Data Service Interface 240, and the metadata and the data definitions fetched form the Data Service Interface 240. Data Governance (Access Control Layer) 250 controls access to the Data Storage Layer 230 by requesting access rights to the Data Storage Layer 230.

In response to a grant of access to the identified dataset, Query Interface 260 generates a query for reading the identified dataset based on the input, the metadata, and the data definitions. Data Storage Layer 230 includes a proxy layer for providing high availability for data discovery of the data at the data storage systems in response to the query and for processing search requests to and responses from a plurality of applications under control of a central coordinator of the Data Storage Layer 230, wherein the central coordinator identifies an active leader from the applications and enables the proxy layer to forward requests to the active leader and to receive responses from the active leader. Data is then fetched directly from data source of Data Storage Layer 230.

At "8", a Create First Level Reports For Analytics 274 is associated with the dataset identified at the data storage is able to be created based on a query. Pattern recognition and classification algorithms run in the background on the basis of the Data Catalog 244 and Data Lineage 246. Data Discovery 242 and Data Catalog 242 of Data Service Interface 240 provides a mechanism that helps users or an application to identify pre-existing dataset patterns by suggesting initial possible matches of the datasets in the Data Storage Layer 230 and the Data Lineages 246. Thus, the searching of the Data Catalog 244 includes crawling through the Data Catalog 244 and the Data Lineage 246, and presenting a suggestion of possible matches of a similar datasets or a similar set of operations to perform to generate the similar dataset.

At "9", Queried Data is Read 266.

Figures 3A, 3B:
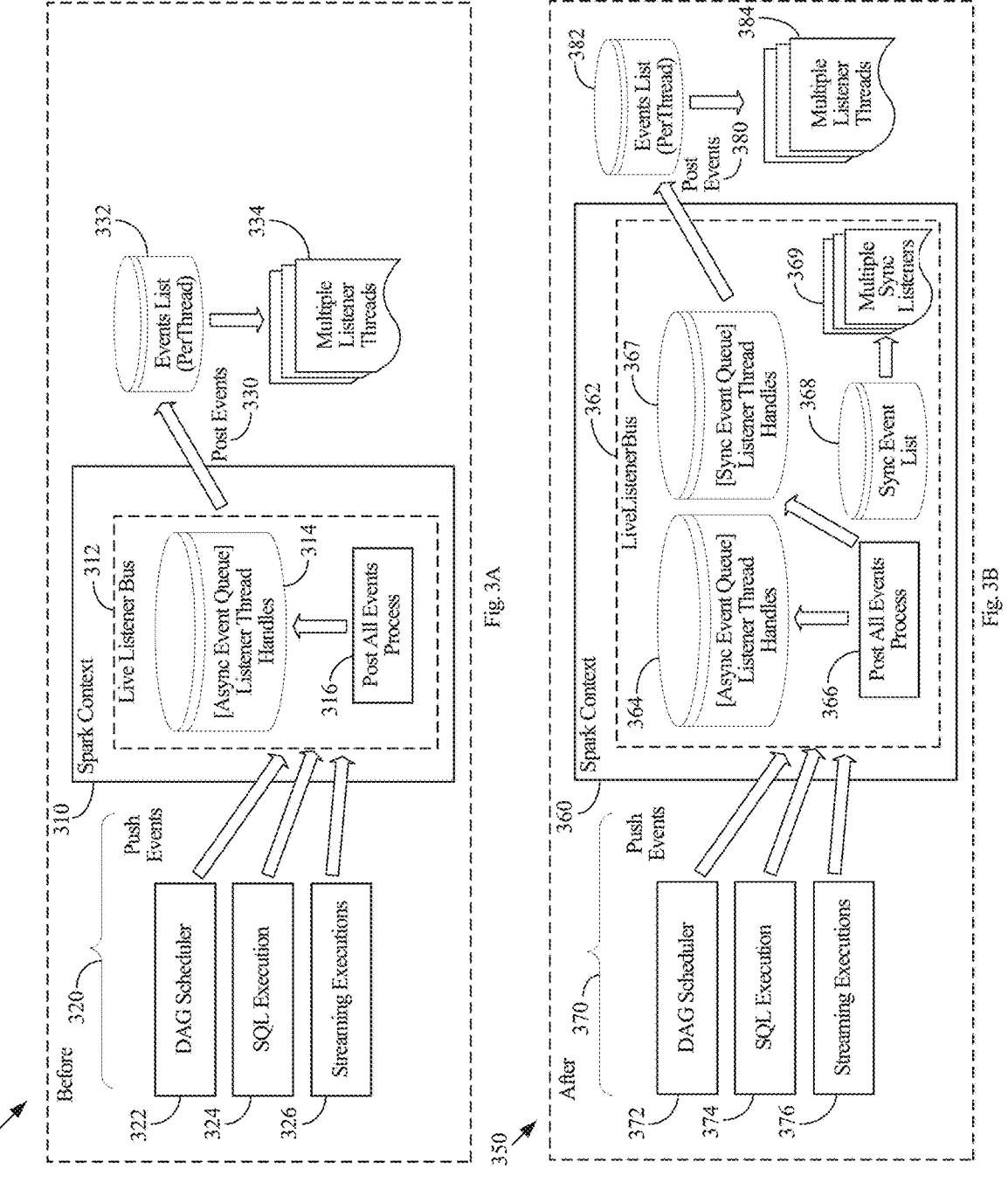
FIG. 3A illustrates a Data Computer Interface without Synchronous Mode.
FIG. 3B illustrates a Data Compute Interface with Synchronous Mode according to at least one embodiment.

FIGS. 3A-B illustrate addition of Synchronous Mode to the Data Compute Interface according to at least one embodiment.

FIG. 3A illustrates Data Computer Interface without Synchronous Mode 300. In FIG. 3A, operation of existing tools, such as Apache Spark 310 is shown. Apache Spark 310 provides a data-processing and analytics engine that implements stage-oriented scheduling using Jobs and Stages. In response to processing a job on top of existing data, a new dataset is created. The data is to be captured in a consistent manner. However, in the existing tools, e.g., Apache Spark 310, there is a problem of inconsistency in Data Lineage due to the asynchronous nature that results in some Data Lineage not being captured.

As shown in FIG. 3A, Spark Context 310 reflects jobs that run on top of data to generate new data points. In order to capture the transformation steps being applied on data, Spark 310 is implemented with a connector that will push the process details to Data Discovery Interface. Events 320, such as from DAG Scheduler 322, SQL Execution 324, Streaming Executions 326, etc., are pushed to a Live Listener Bus 312. Listeners 312 are components notified when events happen. DAG Scheduler 322 transforms a logical execution plan (RDD lineage of dependencies built using RDD transformations) to a physical execution plan (using stages). Resilient Distributed Datasets (RDD) is a fundamental data structure of Spark, and is an immutable distributed collection of objects. A Spark job is a computation sliced into a set of parallel tasks or stages. SQL Execution 324 produces SQL execution metrics. Streaming Execution 326 produces batches of data.

An Asynchronous Event Queue 314 receives Events 320 from an event handler, e.g., Post All Events Process 316. Post Events 330 are provided to an Events List Per Thread 332. Multiple Listener Threads 334 are provided and the events from Events List 332 are provided to the appropriate listener thread in the Multiple Listener Threads 334.

However, because of the asynchronous nature of the Asynchronous Event Queue 314, Data Lineage is not consistently captured. Live Listeners Bus 312 allows events which Spark emits during application execution to be tracked. Events 320 are typically application start/end, job start/end, stage start/end etc. (reference link) Listeners are spawned as a child thread outside of Spark Context 310. Due to this, there is a possibility that in response to the spark main thread completing its functionality and functionality is still being carried out by Listener Threads 334, the thread is killed as the thread is an asynchronous event that the Spark main thread does not wait for completion.

In FIG. 3B, illustrates a Data Computer Interface with Synchronous Mode 350 according to at least one embodiment.

Spark Context 360 reflects jobs that run on top of data to generate new data points. In order to capture the transformation steps being applied on data, Spark 360 is implemented with a connector that will push the process details to Data Discovery Interface. Events 370, such as from DAG Scheduler 372, SQL Execution 374, Streaming Executions 376, etc., are pushed to a Live Listener Bus 362.

An Asynchronous Event Queue 364 receives Events 320 from an event handler, e.g., Post All Events Process 366. A Synchronous Mode is added, wherein the Spark main thread waits for the completion of listener threads. Events, such as from DAG Scheduler, SQL Execution, Streaming Executions, etc., are pushed to a Live Listener Bus. In addition to An Asynchronous Event Queue 364, a Synchronous Event Queue 367 is also able to receive Events 320 from an event handler, e.g., Post All Events Process 366. Synchronous Event Queue 367 ensures that Data Lineage is captured before the job is completed.

More than one instance of Apache Atlas Connector are active. To be able to determine which connector is active contacting Atlas Connector, an additional layer is added on top to check the status and provide a response. Synchronous events are provided to Synchronous Event List 368. From Sync Event List 368, Synchronous events are provided to Multiple Sync Listeners 369. The active connector that is active is requested and connections are checked until an active one is identified.

Post Events 380 are then provided to an Events List Per Thread 382. Multiple Listener Threads 384 are provided and the events from Events List 382 are provided to the appropriate listener thread in the Multiple Listener Threads 384.

Figure 4:
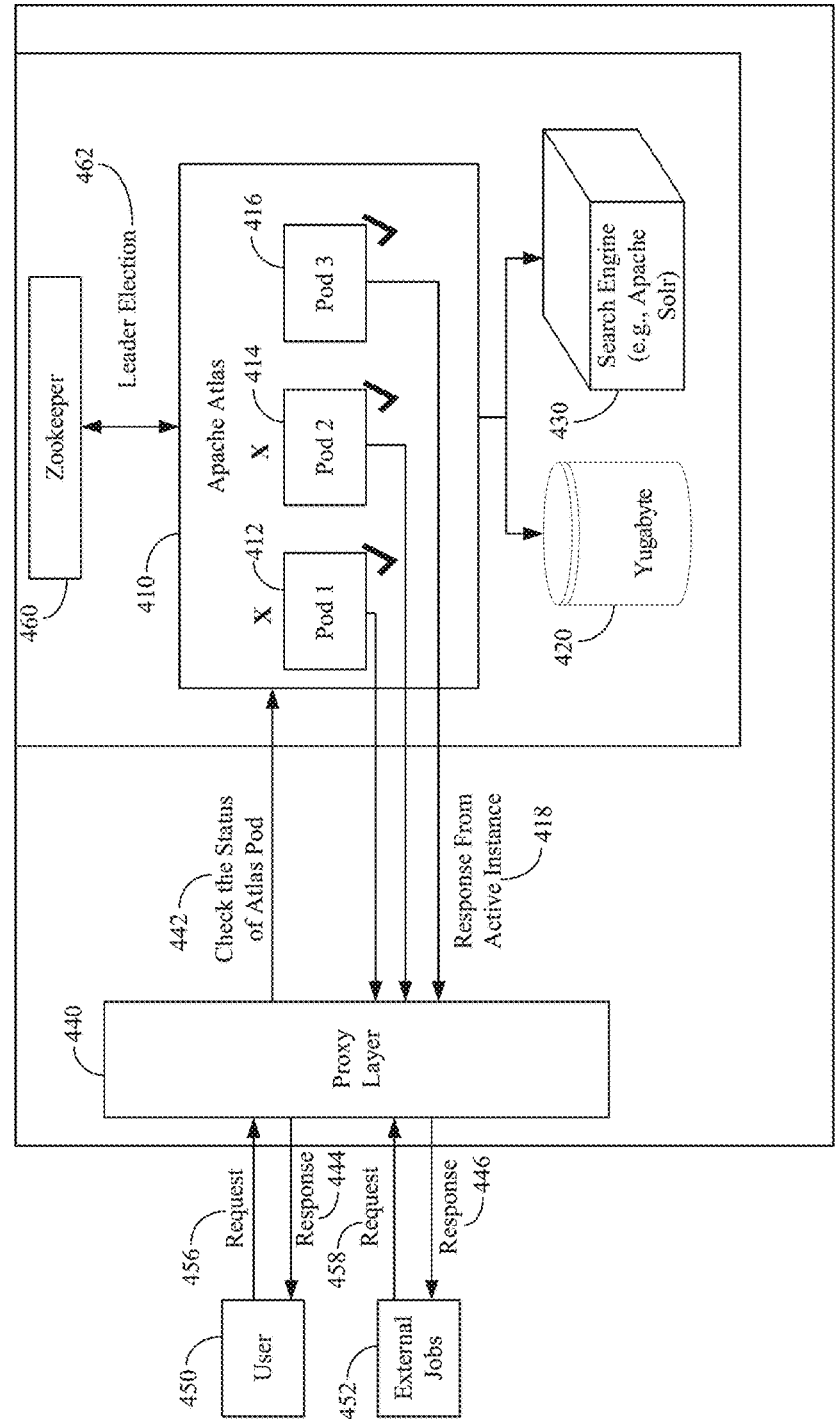
FIG. 4 illustrates high availability of Apache Atlas application pods according to at least one embodiment.

FIG. 4 illustrates high availability of Apache Atlas application pods 400 according to at least one embodiment.

In FIG. 4, Apache Atlas 410 is used to provide aspects of Data Discovery, Data Catalogs, and Data Lineage. Apache Atlas 410 provides native support to Hadoop based systems.

Apache Atlas 410 is able to be deployed on Google Kubernetes (GK) Cluster, Amazon Kubernetes Cluster, a plain Kubernetes Cluster, or any other Kubernetes-Based Clusters. In FIG. 4, instances of Apache Atlas 410 are provided as illustrated by Pods 1 412, Pod 2 414, and Pod 3 416. Apache Atlas 410 is able to has more or less instances than Pods 1 412, Pod 2 414, and Pod 3 416. Apache Atlas is coupled to Yugabyte 420 and to Search Engine 430, e.g., Apache Solr. Apache Atlas 410 uses and interacts with a variety of systems to provide metadata management and Data Lineage. Apache Solr 430 is used to index the Atlas Data so that the data is able to be searched.

Apache Atlas is not reachable in response to failover from an active instance to standby instance on Kubernetes. To address this issue and to make Apache Atlas cloud compatible, a Proxy Layer 440 is used to interface between Apache Atlas 410, and Users 450 and External Jobs 452. A central coordinator, such as Zookeeper 460, is used to manage access to an active instance. Zookeeper 460 is a centralized service for providing configuration information, naming, synchronization and group services over large clusters in distributed systems.

Zookeeper 460 provides an infrastructure for cross-node synchronization by maintaining status type information in memory on Zookeeper 460. Zookeeper 460 keeps a copy of the state of the system and persists this information in local log files. Large Hadoop clusters are able to be supported using multiple Zookeepers 460, with a master server synchronizing the top-level servers.

As shown in FIG. 4, Pod 1 412 and Pod 3 414 are inactive, and Pod 3 416 is Active. In response to an instance not being available, that instance is switched from Active to Inactive.

Proxy Layer 440 is able to Check The Status 442 of Pods 1 412, Pod 2 414, and Pod 3 416. Thus, User 450 is able to access an Active instance without knowing which of Pods 1 412, Pod 2 414, and Pod 3 416 are Active or Inactive. Proxy Layer 440 determines which of Pods 1 412, Pod 2 414, and Pod 3 416 is Active.

As multiple instances of Apache Atlas 410 are started under the same Zookeeper 460 Proxy Layer 440 automatically determines that Pod 3 416 is Active and Pod 3 is thus selected to service user requests. The other instances, e.g., Pods 1 412 and Pod 414, will automatically be deemed Inactive. In response to the Active instance becoming unavailable, either because the instance is deliberately stopped, or due to failures, one of the other instances automatically is elected as an Active instance and starts to service user requests. An Active instance is the instance that is able to respond to user requests correctly. The Active instance is able to create, delete, modify or respond to queries on metadata objects. Zookeeper 460 takes care of election of the Current Leader Selection 462, i.e., Active instance (e.g., Pod 416), where Pod 412 and Pod 414 are down or Inactive. Proxy Layer 440 keeps track of the current Active instances and forwards Requests 456, 458 to the Active instance. Thus, Zookeeper is able to provide a Response 418 to Proxy Layer 440 from the Active Leader, e.g., Pod 3 416. Proxy Layer 440 then forwards Response 444 to User 450 or Response 446 to External Jobs 452.

Figure 5:
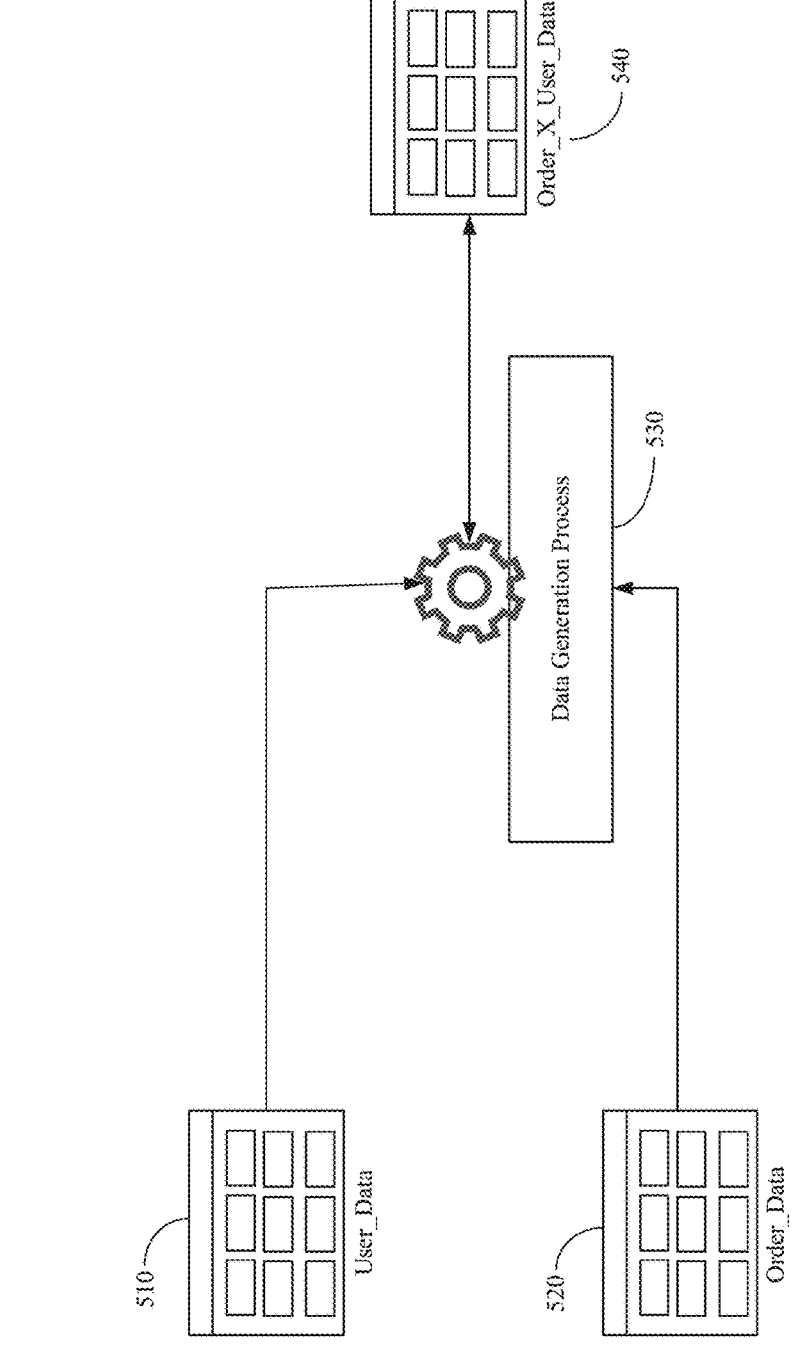
FIG. 5 illustrates simple Data Linage as provided by existing components.

FIG. 5 illustrates simple Data Linage 500 as provided by existing components.

In FIG. 5, a First Dataset, User_Data 510, and a Second Dataset, Order_Data 520, have been joined at Data Generation Process 530 to create a Third Dataset, Order_X_ User_Data 540. The user is able to use the Third Dataset, Order_X_User_Data 540. Data Lineage identifies that the Third Dataset, Order_X_User_Data 540, originated from the First Dataset, User_Data 510, and the Second Dataset, Order_Data 520, and that Data Generation Process 530 was used to generate the Third Dataset, Order_X_User_Data 540. Some existing products provide this type of Data Lineage. Some existing products also provide a SQL process that generates the Third Dataset.

However, there is a problem in response to the Data Generation Process 530 for transforming the First Dataset, User_Data 510, and the Second Dataset. Order_Data 520 being more complex. The details of a complex transformation sequence is not able to be reproduced as a single sequence.

Figure 6:
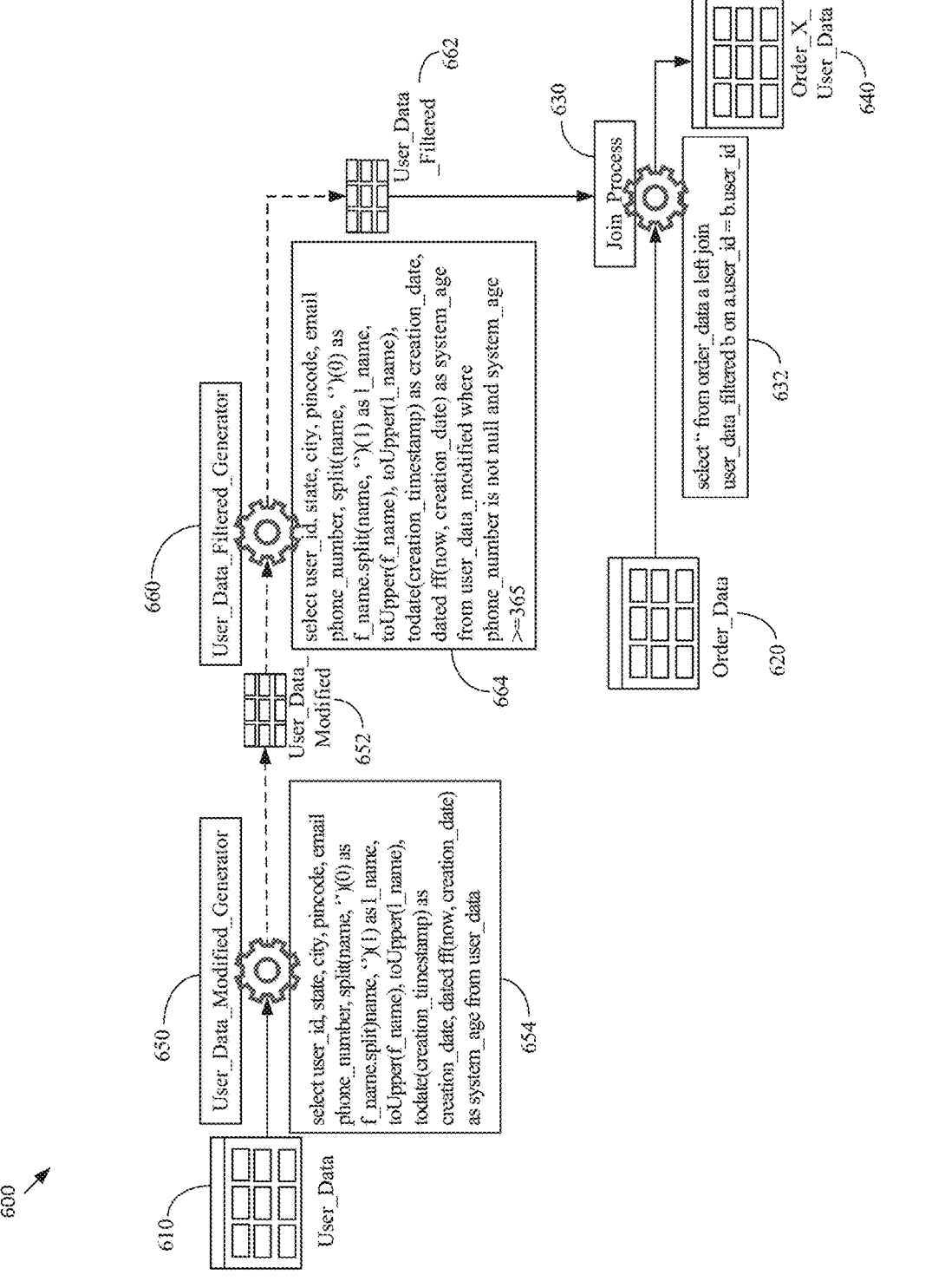
FIG. 6 illustrates capture of discrete processes in Detailed Data Lineage according to at least one embodiment.

FIG. 6 illustrates capture of discrete processes in Detailed Data Lineage 600 according to at least one embodiment.

In FIG. 6, Detailed Data Lineage 600 for joining User_Data 610 and Order_Data 620 is broken down to provide details of the process prior to the Join Process 630. Overall the process is similar to where User-Data 610 and Order_Data 620 are transformed to produce Order_X_ User_Data 640. However, the discrete internal processes that occur before generating the Third Dataset, i.e., Order_X_User_Data 630, are captured.

In FIG. 6, the Detailed Data Lineage 600 is broken down at a low level to represent intermediate data and intermediate processes as well to make the lineage more informative. The capture of the discrete processes helps end users to decide upon data usage accordingly.

The User_Data 610 is provided to User_Data_ Modified_Generator 650 to produce User_Data_Modified 642. As an example, User_Data 610 is modified according to Modification Operation 654 of "select user_id, state, city, pincode, emai, phone_number, split(name, ' ')(0) as f_name.split)name, ' ')(1) as l_name, toUpper(f_ name), toUpper(l_name), todate(creation_timestamp) as creation_date, dated ff(now, creation_date) as system_age from user_data" to produce User_Data_Modified 652. Those skilled in the art recognize that embodiments described herein are not meant to be limited to the Modification Operation 654 described herein, but other or additional modifications are capable of being made.

Next, User_Data_Modified 652 is filtered at User_ Data_Filtered_Generator 660 to remove some irrelevant data to produce User_Data_Filtered 662. For example, in FIG. 6, User_Data_Modified 652 is filtered by User_ Data_Filtered_Generator 660 according to Filter Operation 664 of "select user_id, state, city, pincode, email, phone_number, split(name, ' ')(0) is f_name.split (name, ' ')(1) as l_name, toUpper(f_name), toUpper (l_name), todate(creation_timestamp) as creation_date, dated ff(now, creation_date) as system_age from user_ data_modified where phone_number is not null and system_age>=365" to produce User_Data_Filtered 662. However, those skilled in the art recognize that embodiments described herein are not meant to be limited to the Filter Operation 664 described here, but other or additional filter operations are capable of being made.

Then, Order_Data 620 is joined with the User_Data_Filtered 662 to produce Order_X_User_Data 640. For example, User_Data_Filtered 662 is joined with Order_Data 620 using a Join Process 630 according to Join Operation 632 of "select" from order_data a left join user_data_filtered b on a.user_id=b.user_id" to produce Order_X_User_Data 640. However, as with Modification Operation 654 and Filter Operation 664 described above, those skilled in the art recognize that embodiments described herein are not meant to be limited to the Join Operation 632 described here, but other or additional join operations are capable of being made.

The capture of the details of the processes in the Detailed Data Lineage 600 enables a user to determine what is happening internally, and is not limited to just some processes, name, or basic sequence. The Detailed Data Lineage 600 enables a user to make confident decisions based on the details of the processes or sequences.

Figure 7:
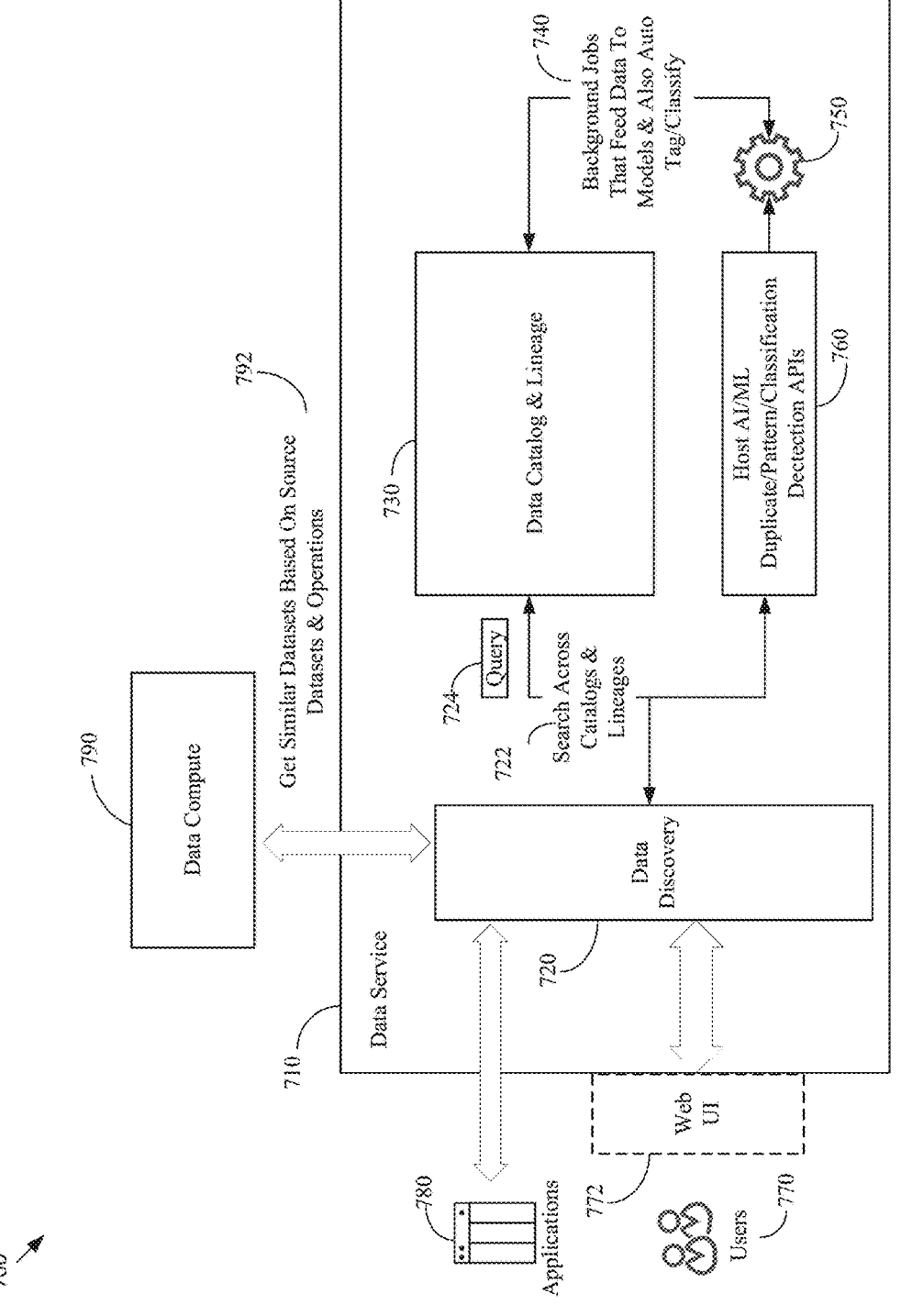
FIG. 7 illustrates Data Pattern Detection and Optimization according to at least one embodiment.

FIG. 7 illustrates Data Pattern Detection and Optimization 700 according to at least one embodiment.

In FIG. 7, Data Service 710 includes a Data Discovery Interface 720 that enables users/applications to Search 722 for data across the Data Catalog and Data Lineage 730.

Data Discovery Interface 720 provide search query 724 to Data Catalog and Data Lineage 730. Background jobs 740 feed data to a Process 750 that models and also automatically tags and classifies data. Host Artificial Intelligence/ Machine Learning (AI/ML) 760 run in the background on the basis of the Data Catalogue and Data Lineage 730. Users 770 via, for example Web User Interface (UI) 772, or Applications 780 are able to use AI/ML 760 to identify pre-existing dataset patterns using suggestions of possible matches of the datasets and the Data Catalog and Data Lineage 730. Thus, the searching of the Data Catalog and Data Lineage 730 includes the AI/ML crawling through the Data Catalog and the Data Lineage 730 and presenting a suggestion of possible matches of a similar dataset or a similar set of operations to perform to generate the similar dataset.

In Data Compute Interface 790, a user is able to first select the source dataset, then define set of operations/transformations and run jobs to execute the operations to generate the datasets 792. While defining those jobs, internally, Data Compute Interface 790 uses the pattern detection capability provided by Data Discovery Interface 720, with inputs as the source dataset and set of transformations being applied, to present the user with a pre-existing patterns in the system. This prevents user in creating a duplicate set of jobs and datasets.

In the Data Discovery Interface 720, in response to Users 770 or Applications 780 searching for data with the terms/ classifications/tags associated, apart from the list of datasets, the results presented include the list of pre-existing operations that are applied on the item.

Similarly any external Application 780 is able to use the pattern detection capability provided by AI/ML 760 to avoid duplicity of datasets and compute jobs. Also, there are background jobs that run continuously feeding Data Catalog and Data Lineage 730 to the hosted Models 750. This will help in creating system generated tags and classifications that are able to be directly used by the user for enhancing the search, or used internally by Data Discovery Interface 730 to detect similar datasets and transformation patterns.

FIG. 8 is a flowchart 800 of a method for providing large scale data discovery with near real-time data cataloging and detailed lineage according to at least one embodiment.

In FIG. 8, the process starts S810 and data from one or more sources is received S810. Referring to FIG. 2, an Authentication and Middleware Interface 210 receives input from one or more sources 212, for example, through a Web UI 214 and/or an Onboarding Interface 216.

The received data is written to a data storage systems S814. Referring to FIG. 2, a Data Compute Interface 220 includes a Data Generation and Transformation Layer that writes or reads data toward Data Storage Layer 230. Data Governance (Access Control Layer) 250 controls access to the Data Storage Layer 230 by determining access rights to the Data Storage Layer 230.

The received data is processed at the data storage systems using sensors at the data storage systems S818. Referring to FIG. 2, at "3", Sensors 238 are written for the database that categorizes data into new data and changed data, and captures change information that is pushed to Data Computer Interface 220 and then to Data Service Interface 240. Sensors 238 detect changes in data and then push the changes to the Data Computer Interface 220 and then to Data Service Interface 240. For example, a file that is written to the database, and Sensors 238 sends the file to Data Compute Interface 220. Metadata Capture Services pull these and create Data Catalog 244 and Data Lineage 246.

Metadata and data definitions associated with the data are sent to a data service in near real-time S822. Referring to FIG. 2, at "5", Data Compute Interface 220 pushes Metadata Create Data Lineage and Data Audits 280 towards Data Service Interface 240. Data definitions are also able to be provided by Data Compute Interface 220 to Data Service Interface 240.

A data catalog is generated at the data service based on the metadata and data definitions associated with the data S826. Referring to FIG. 2, Data Service Interface 240 includes a Data Discovery Interface 242 and presents Data Catalog 244 and Data Lineage 246. In response to the file being generated from an already existing file, Data Lineage 246 is captured that identifies the file as being derived from the earlier existing file. Metadata Information 280 is presented by Data Compute Interface 220 to Data Service Interface 240 in unified discovery format that is then provided to duplication sensor.

Data lineage for the data is crated at the data service S830. Referring to FIG. 2, at "6", duplicates in the Data Lineage and the Data Catalog 281 are eliminated. New data paths that share the same jobs are added to Data Lineage 246 and the data paths are associated under one Data Catalog 244 based on the metadata and data definitions. The Data Catalog 244 presents catalogues related information, such as lineage, data path, owner, data description, etc. in Data Discovery 242.

The data catalog and data lineage are presented at a data discovery interface of the data service S834. Referring to FIG. 2, a user is able to Search and Discover Data Of Interest 270 across the data by accessing Data Discovery Interface 242 at Data Service Interface 240. At "4", Data Compute Interface 220 pulls Metadata Change Events 228. Data Lineage 246 is created to present detailed, granular lineage information including details such data classifications and business topology that are tagged to the metadata for use in performing complex data transformations.

Input is received via the data discovery interface for querying the metadata associated with the data at the data storage systems S838. Referring to FIG. 2, Data Lineage and Data Audit 280 are pushed from Data Compute Interface 220 to Data Service Interface 240. Data Service Interface 240 receives input for querying the metadata associated with the data at the data storage systems. Tag Data, and Created Classification and Categorizations 271 are associated with the data.

A dataset at the data storage systems is identified by the query interface based on the input, the metadata, and the data definitions S842. Referring to FIG. 2, when a query is generated by Data Query Interface 260, a dataset is identified by Data Query Interface 260 at the Data Storage Layer 230 based on the input to Data Discovery Interface 242 of Data Service Interface 240, and the metadata and the data definitions fetched form the Data Service Interface 240.

Access to the identified dataset at the data storage systems is requested S846. Referring to FIG. 2, Data Governance (Access Control Layer) 250 controls access to the Data Storage Layer 230 by requesting access rights to the Data Storage Layer 230.

In response to a grant of access to the identified dataset, the query interface generates a query for reading the identified dataset based on the input, the metadata, and the data definitions S850. Referring to FIG. 2, in response to a grant of access to the identified dataset, Query Interface 260 generates a query for reading the identified dataset based on the input, the metadata, and the data definitions. Data Storage Layer 230 includes a proxy layer for providing high availability for data discovery of the data at the data storage systems in response to the query and for processing search requests to and responses from a plurality of applications under control of a central coordinator of the Data Storage Layer 230, wherein the central coordinator identifies an active leader from the applications and enables the proxy layer to forward requests to the active leader and to receive responses from the active leader. Data is then fetched directly from data source of Data Storage Layer 230.

The process then terminates S860.

At least one embodiment of the method for providing large scale data discovery with near real-time data cataloging and detailed lineage includes receiving data from one or more sources, writing the received data to a data storage systems, processing the received data at the data storage systems using sensors at the data storage systems, sending metadata and data definitions associated with the data to a data service in near real-time, generating, at the data service, a data catalog based on the metadata and data definitions associated with the data, creating, at the data service, data lineage for the data, and presenting the data catalog and data lineage at a data discovery interface.

Figure 9:
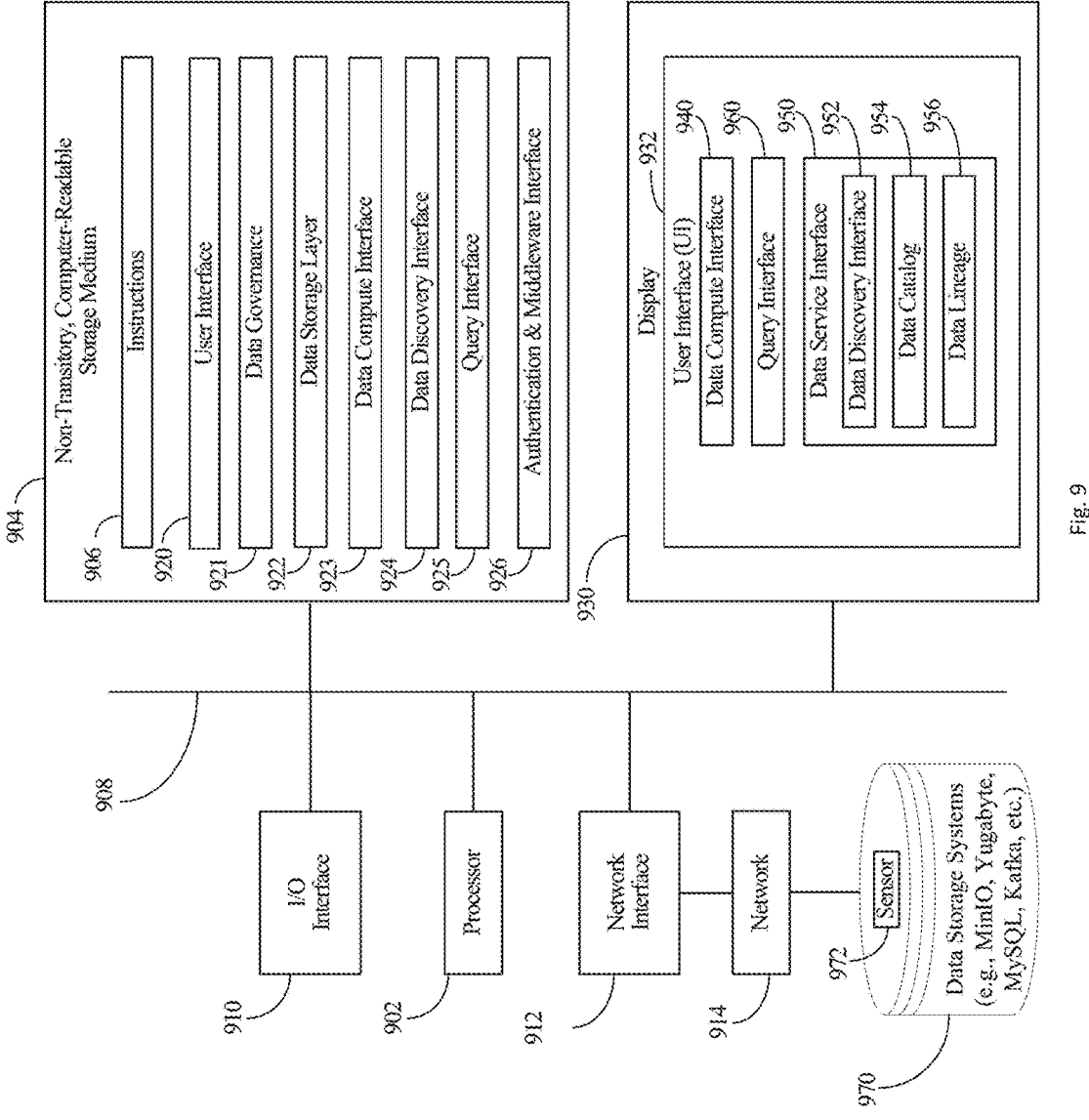
FIG. 9 is a high-level functional block diagram of a processor-based system according to at least one embodiment.

FIG. 9 is a high-level functional block diagram of a processor-based system 900 according to at least one embodiment.

In at least one embodiment, processing circuitry 900 provides large scale data discovery with near real-time data cataloging and detailed lineage. Processing circuitry 900 implements large scale data discovery with near real-time data cataloging and detailed lineage using Processor 902. Processing circuitry 900 also includes a Non-Transitory, Computer-Readable Storage Medium 904 that is used to implement a data platform for providing large scale data discovery with near real-time data cataloging and detailed lineage. Non-Transitory, Computer-Readable Storage Medium 904, amongst other things, is encoded with, i.e., stores, Instructions 906, i.e., computer program code, that are executed by Processor 902 causes Processor 902 to perform operations for providing large scale data discovery with near real-time data cataloging and detailed lineage. Execution of Instructions 906 by Processor 902 represents (at least in part) an application which implements at least a portion of the methods described herein in accordance with one or more embodiments (hereinafter, the noted processes and/or methods).

Processor 902 is electrically coupled to Non-Transitory, Computer-Readable Storage Medium 904 via a Bus 908. Processor 902 is electrically coupled to an Input/Output (I/O) Interface 910 by Bus 908. A Network Interface 912 is also electrically connected to Processor 902 via Bus 908. Network Interface 912 is connected to a Network 914, so that Processor 902 and Non-Transitory, Computer-Readable Storage Medium 904 connect to external elements via Network 914. Processor 902 is configured to execute Instructions 906 encoded in Non-Transitory, Computer-Readable Storage Medium 904 to cause processing circuitry 900 to be usable for performing at least a portion of the processes and/or methods. In one or more embodiments, Processor 902 is a Central Processing Unit (CPU), a multi-processor, a distributed processing system, an Application Specific Integrated Circuit (ASIC), and/or a suitable processing unit.

Processing circuitry 900 includes I/O Interface 910. I/O interface 910 is coupled to external circuitry. In one or more embodiments, I/O Interface 910 includes a keyboard, keypad, mouse, trackball, trackpad, touchscreen, and/or cursor direction keys for communicating information and commands to Processor 902.

Processing circuitry 900 also includes Network Interface 912 coupled to Processor 902. Network Interface 912 allows processing circuitry 900 to communicate with Network 914, to which one or more other computer systems are connected. Network Interface 912 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 900 is configured to receive information through I/O Interface 910. The information received through I/O Interface 910 includes one or more of instructions, data, design rules, libraries of cells, and/or other parameters for processing by Processor 902. The information is transferred to Processor 902 via Bus 908. Processing circuitry 900 is configured to receive information related to a User Interface (UI) through I/O Interface 910. The information is stored in Non-Transitory, Computer-Readable Storage Medium 904 as UI 922.

In one or more embodiments, one or more Non-Transitory, Computer-Readable Storage Medium 904 having stored thereon Instructions 906 (in compressed or uncompressed form) that may be used to program a computer, processor, or other electronic device) to perform processes or methods described herein. The one or more Non-Transitory, Computer-Readable Storage Medium 904 include one or more of an electronic storage medium, a magnetic storage medium, an optical storage medium, a quantum storage medium, or the like.

For example, the Non-Transitory, Computer-Readable Storage Medium 904 may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Media 904 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 904 stores Instructions 906 configured to cause Processor 902 to perform at least a portion of the processes and/or methods for implementing a Data Platform as described herein. In one or more embodiments, Non-Transitory, Computer-Readable Storage Medium 904 also stores information, such as algorithm which facilitates performing at least a portion of the processes and/or methods for implementing a Data Platform as described herein.

Accordingly, in at least one embodiment, Processor 902 executes Instructions 906 at Non-Transitory Computer-Readable Medium to implement an Authentication and Middleware Interface 926 for receiving input from one or more sources, for example, through User Interfaces 920, such as a Web UI and/or an Onboarding Interface. Processor further executes Instructions 906 at Non-Transitory Computer-Readable Medium to implement Data Governance 921, Data Storage Layer 922, Data Compute Interface 923, Data Discovery Interface 924, and Query Interface 925. Processor 902 executes Instructions 906 at Non-Transitory Computer-Readable Medium to implement a User Interface 932 on a Display 930 for providing large scale data discovery with near real-time data cataloging and detailed lineage. User Interface 932 is able to display data as managed in Data Platform 900 by Processor 902. User Interface 932 includes a Data Compute Interface 940, a Data Service Interface 950, and a Query Interface 960. Data Compute Interface 940 includes a Data Generation and Transformation Layer that writes or reads data toward Data Storage Layer. Data Governance (Access Control Layer) controls access to the Data Storage Layer 922 by determining access rights to the Data Storage Layer 922. New data and changes are captured by Data Storage Layer 922 and are pushed to Data Compute Interface 940 and then to Data Service Interface 950. For example, a file that is written to the database, and Sensors 972 at Data Storage Systems 970 send the file to Data Compute Interface 940. Metadata Capture Services pull these and create Data Catalog 954 and Data Lineage 956 at Data Service Interface 950. Data Compute Interface 940 pushes Metadata, creates Data Lineage 956, and performs Data Audits. This information is pushed to Data Service Interface 950 in near real-time. Data definitions are also able to be provided by Data Compute Interface 940 to Data Service Interface 950. Data Service Interface 950 includes a Data Discovery Interface 952 and presents Data Catalog 954 and Data Lineage 956. In response to the file being generated from an already existing file, Data Lineage 956 is captured that identifies the file as being derived from the earlier existing file. Metadata Information is presented by Data Compute Interface 940 to Data Service Interface 950 in unified discovery format that is then provided to duplication sensor. Duplicates in the Data Lineage 956 and the Data Catalog 954 are determined and eliminated. New data paths that share the same jobs are added to Data Lineage 956 and the data paths are associated under one Data Catalog 954 based on the metadata and data definitions. Data Catalog 954 presents catalogues related information, such as lineage, data path, owner, data description, etc. in Data Discovery Interface 952. A user is able to search and discover data of interest across the data by accessing Data Discovery Interface 952 at Data Service Interface 950. Data Compute Interface 940 pulls Metadata Change Events. Data Lineage 956 is created to present detailed, granular lineage information including details such data classifications and business topology that are tagged to the metadata for use in performing complex data transformations. Data Lineage 956 and Data Audit are pushed from Data Compute Interface 940 to Data Service Interface 950. Data Service Interface 950 receives input at Data Discovery Interface 952 for querying the metadata associated with the data at the Data Storage Systems 970. Tag data, and Classification and Categorizations data are associated with the data. When a query is generated by Data Query Interface 960, a dataset is identified by Data Query Interface 960 at the Data Storage Layer 922 based on the input to Data Discovery Interface 952 of Data Service Interface 950, and the metadata and the data definitions fetched from the Data Service Interface 950. Data Governance (Access Control Layer) controls access to the Data Storage Layer 922 by requesting access rights to the Data Storage Layer 922. In response to a grant of access to the identified dataset, Data Query Interface 960 generates a query for reading the identified dataset based on the input, the metadata, and the data definitions. Data Storage Layer 922 includes a proxy layer for providing high availability for data discovery of the data at the Data Storage Systems 970 in response to the query and for processing search requests to and responses from a plurality of applications under control of a central coordinator of the Data Storage Layer 922, wherein the central coordinator identifies an active leader from the applications and enables the proxy layer to forward requests to the active leader and to receive responses from the active leader. Data is then fetched directly from Data Storage Systems 970 by Data Storage Layer 922.

Embodiments described herein thus provide certain advantages. These advantages include one or more of providing a one-stop solution for data usage lifecycle, providing discoverability of data to end user in near real time because of the minimization of manual intervention, enabling informed business decisions to be made due to the low level lineage with detailed steps involved in data transformation and other metadata details that includes schema, provides ease of use due to automatic creation of the Data Catalog and integration with a Query Layer, or provisioning of proper data meaning and accountability. The capability for pattern detection helps any user to detect/search any data on the basis of a type of operation (or a set of operations) that lead to the generation of a particular data. This knowledge helps users/applications avoid duplication of datasets and the operations that are used to generate them there-by reducing cost & effort for the same.

An aspect of this description is directed to a method [1] for providing a data platform includes receiving data from one or more sources, writing the received data to one or more data storage systems, processing the received data at the one or more data storage systems using sensors at the data storage systems, sending metadata and data definitions associated with the data to a data service in near real-time, generating, at the data service, a data catalog based on the metadata and data definitions associated with the data, creating, at the data service, data lineage for the data, and presenting the data catalog and data lineage at a data discovery interface.

The method described in [1], further includes receiving input via the data discovery interface for querying the metadata associated with the data at the data storage systems, and identifying a dataset at the data storage systems based on the input, the metadata, and the data definitions.

The method described in [1] to [2], further includes requesting access to the identified dataset at the data storage, and in response to a grant of access to the identified dataset, generating a query for reading the identified dataset based on the input, the metadata, and the data definitions.

The method described in [1] to [3], further includes providing high availability for data discovery of the data at the data storage systems in response to the query by providing a proxy layer for processing search requests to and responses from a plurality of applications under control of a central coordinator, wherein the central coordinator identifies an active leader from the applications and enables the proxy layer to forward requests to the active leader and to receive responses from the active leader.

The method described in [1] to [4], further includes creating, at the data service, data audits associated with the data, and pulling, by the data compute interface, change events representing the data for the one or more sources at the data storage systems.

The method described in [1] to [5], wherein the creating the data lineage includes identifying discrete processes in a data flow associated with the data, eliminating duplicates in the data lineage and the data catalog associated with the data by performing pattern recognition on the metadata associated with the data using artificial intelligence to identify the duplicates in the data lineage and the data catalog associated with the data and eliminating the duplicates in the data lineage and the data catalog, and presenting a detailed, granular data lineage and data catalog for usage in performing complex data transformations.

The method described in [1] to [6], wherein the writing the received data to the data storage systems includes determining access rights to the data storage systems for writing the data to the data storage systems.

An aspect of this description is directed to a data platform [8], including a memory storing computer-readable instructions, and a processor connected to the memory, wherein the processor is configured to execute the computer-readable instructions to perform operations to receive data from one or more sources, write the received data to a data storage systems, process the received data at the data storage systems using sensors at the data storage systems, send metadata and data definitions associated with the data to a data service in near real-time, generate, at the data service, a data catalog based on the metadata and data definitions associated with the data, create, at the data service, data lineage for the data, and present the data catalog and data lineage at a data discovery interface.

The data platform described in [8], wherein the processor is further configured to receive input via the data discovery interface for querying the metadata associated with the data at the data storage systems, and identify a dataset at the data storage systems based on the input, the metadata, and the data definitions.

The data platform described in [8] to [9], wherein the processor is further configured to request access to the identified dataset at the data storage systems, and in response to a grant of access to the identified dataset, generate a query for reading the identified dataset based on the input, the metadata, and the data definitions.

The data platform described in [8] to [10], wherein the processor is further configured to provide high availability for data discovery of the data at the data storage systems in response to the query by providing a proxy layer for processing search requests to and responses from a plurality of applications under control of a central coordinator, wherein the central coordinator identifies an active leader from the applications and enables the proxy layer to forward requests to the active leader and to receive responses from the active leader.

The data platform described in [8] to [11], wherein the processor is further configured to create, at the data service, data audits associated with the data, and pulling change events representing the data for the one or more sources at the data storage systems.

The data platform described in [8] to [12], wherein the processor is further configured to create the data lineage by identifying discrete processes in a data flow associated with the data, eliminating duplicates in the data lineage and the data catalog associated with the data by performing pattern recognition on the metadata associated with the data using artificial intelligence to identify the duplicates in the data lineage and the data catalog associated with the data and eliminating the duplicates in the data lineage and the data catalog, and presenting a detailed, granular data lineage and data catalog for usage in performing complex data transformations.

The data platform described in [8] to [13], wherein the processor is further configured to write the received data to the data storage systems by determining access rights to the data storage systems for writing the data to the data storage systems.

An aspect of this description is directed to a non-transitory computer-readable media having computer-readable instructions stored thereon [15}, which when executed by a processor causes the processor to perform operations including receiving data from one or more sources, writing the received data to a data storage systems, processing the received data at the data storage systems using sensors at the data storage systems, sending metadata and data definitions associated with the data to a data service in near real-time, generating, at the data service, a data catalog based on the metadata and data definitions associated with the data, creating, at the data service, data lineage for the data, and presenting the data catalog and data lineage at a data discovery interface.

The non-transitory computer-readable media described in [15], further includes receiving input via the data discovery interface for querying the metadata associated with the data at the data storage systems, and identifying a dataset at the data storage based on the input, the metadata, and the data definitions, requesting access to the identified dataset at the data storage systems, and in response to a grant of access to the identified dataset, generating a query for reading the identified dataset based on the input, the metadata, and the data definitions.

The non-transitory computer-readable media described in [15] to [16], further includes providing high availability for data discovery of the data at the data storage systems in response to the query by providing a proxy layer for processing search requests to and responses from a plurality of applications under control of a central coordinator, wherein the central coordinator identifies an active leader from the applications and enables the proxy layer to forward requests to the active leader and to receive responses from the active leader.

The non-transitory computer-readable media described in [15] to [17], further includes creating, at the data service, data audits associated with the data, and pulling change events representing the data for the one or more sources at the data storage systems.

The non-transitory computer-readable media described in [15] to [18], wherein the creating the data lineage includes identifying discrete processes in a data flow associated with the data, eliminating duplicates in the data lineage and the data catalog associated with the data by performing pattern recognition on the metadata associated with the data using artificial intelligence to identify the duplicates in the data lineage and the data catalog associated with the data and eliminating the duplicates in the data lineage and the data catalog, and presenting a detailed, granular data lineage and data catalog for usage in performing complex data transformations.

The non-transitory computer-readable media described in [15] to [19], wherein the writing the received data to the data storage systems includes determining access rights to the data storage systems for writing the data to the data storage systems.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for providing a data platform, comprising:
   receiving data from one or more sources;
   categorizing the received data applicable to one of one or more storage systems using sensors;
   writing the received data to the one of the one or more storage systems based on the categorization of the received data applicable to the one of the one or more storage systems;
   processing the received data at the one of the one or more storage systems based on the categorization of the received data applicable to the one of the one or more storage systems;
   sending metadata and data definitions associated with the data received from the one of the one or more storage systems to a data service;
   generating, at the data service, a data catalog based on the metadata and the data definitions associated with the data;
   creating, at the data service, data lineage for the data to present lineage information including data classifications and business topology that are tagged to the metadata for use in performing complex data transformations;
   receiving input via a data discovery interface for querying the metadata associated with the data at the one of the one or more storage systems; and
   crawling through the data catalog and the data lineage using artificial intelligence to present a suggestion of possible matches of a similar dataset or a similar set of operations to perform to generate the similar dataset.

2. The method of claim 1 further comprising at least one of:
   presenting the data catalog and the data lineage at the data discovery interface or displaying on a display device the suggestion of the possible matches of the similar dataset or the similar set of operations to perform to generate the similar dataset.

3. The method of claim 2 further comprising:
   requesting access to an identified dataset at the one of the one or more storage systems; and
   in response to a grant of the access to the identified dataset, generating a query for reading the identified dataset based on the input, the metadata, and the data definitions.

4. The method of claim 1 further comprising providing high availability for data discovery of the data at the one of the one or more storage systems in response to a query by providing a proxy layer for processing search requests to and responses from a plurality of applications under control of a central coordinator, wherein the central coordinator identifies an active leader from the applications and enables the proxy layer to forward requests to the active leader and to receive responses from the active leader.

5. The method of claim 1 further comprising creating, at the data service, data audits associated with the data, and pulling, by a data compute interface, change events representing the data for the one or more sources at the one of the one or more storage systems.

6. The method of claim 1, wherein the creating the data lineage includes:
   identifying discrete processes in a data flow associated with the data;
   eliminating duplicates in the data lineage and the data catalog associated with the data by performing pattern recognition on the metadata associated with the data using the artificial intelligence to identify the duplicates in the data lineage and the data catalog associated with the data and eliminating the duplicates in the data lineage and the data catalog; and
   presenting a detailed, granular data lineage and the data catalog for usage in performing the complex data transformations.

7. The method of claim 1, wherein the writing the received data to the one of the one or more storage systems includes determining access rights to the one of the one or more storage systems for writing the data to the one of the one or more storage systems.

8. A data platform, wherein the data platform is configured to:
   receive data from one or more sources;
   categorize the received data applicable to one of one or more storage systems using sensors;
   write the received data to the one of the one or more storage systems based on the categorization of the received data applicable to the one of the one or more storage systems;
   process the received data at the one of the one or more storage systems based on the categorization of the received data applicable to the one of the one or more storage systems;
   send metadata and data definitions associated with the data received from the one of the one or more storage systems to a data service;
   generate, at the data service, a data catalog based on the metadata and the data definitions associated with the data;
   create, at the data service, data lineage for the data to present lineage information including data classifications and business topology that are tagged to the metadata for use in performing complex data transformations;
   receive input via a data discovery interface for querying the metadata associated with the data at the one of the one or more storage systems;
   crawl through the data catalog and the data lineage using artificial intelligence to present a suggestion of possible matches of a similar dataset or a similar set of operations to perform to generate the similar dataset.

9. The data platform of claim 8, further configured to:
   presenting the data catalog and the data lineage at the data discovery interface or displaying on a display device the suggestion of the possible matches of the similar dataset or the similar set of operations to perform to generate the similar dataset.

10. The data platform of claim 9, further configured to:
   request access to an identified dataset at the one of the one or more storage systems; and in response to a grant of the access to the identified dataset, generate a query for reading the identified dataset based on the input, the metadata, and the data definitions.

11. The data platform of claim 8, further configured to provide high availability for data discovery of the data at the one of the one or more storage systems in response to a query by providing a proxy layer for processing search requests to and responses from a plurality of applications under control of a central coordinator, wherein the central coordinator identifies an active leader from the applications and enables the proxy layer to forward requests to the active leader and to receive responses from the active leader.

12. The data platform of claim 8, further configured to create, at the data service, data audits associated with the data, and pulling change events representing the data for the one or more sources at the one of the one or more storage systems.

13. The data platform of claim 8, further configured to create the data lineage by:
    identifying discrete processes in a data flow associated with data;
    eliminating duplicates in the data lineage and the data catalog associated with the data by performing pattern recognition on the metadata associated with the data using the artificial intelligence to identify the duplicates in the data lineage and the data catalog associated with the data and eliminating the duplicates in the data lineage and the data catalog; and
    presenting a detailed, granular data lineage and the data catalog for usage in performing the complex data transformations.

14. The data platform of claim 8, further configured to write the received data to the one of the one or more storage systems by determining access rights to the one of the one or more storage systems for writing the data to the one of the one or more storage systems.

15. A non-transitory computer-readable media having computer-readable instructions stored thereon, which when executed by a processor causes the processor to perform operations comprising:
    receiving data from one or more sources;
    categorizing the received data applicable to one of one or more storage systems using sensors;
    writing the received data to the one of the one or more storage systems based on the categorization of the received data applicable to the one of the one or more storage systems;
    processing the received data at the one of the one or more storage systems based on the categorization of the received data applicable to the one of the one or more storage systems;
    sending metadata and data definitions associated with the data received from the one of the one or more storage systems to a data service;
    generating, at the data service, a data catalog based on the metadata and the data definitions associated with the data;

creating, at the data service, data lineage for the data to present lineage information including data classifications and business topology that are tagged to the metadata for use in performing complex data transformations;
    receiving input via a data discovery interface for querying the metadata associated with the data at the one of the one or more storage systems; and
    crawling through the data catalog and the data lineage using artificial intelligence to present a suggestion of possible matches of a similar dataset or a similar set of operations to perform to generate the similar dataset.

16. The non-transitory computer-readable media of claim 15 further comprising:
    presenting the data catalog and the data lineage at the data discovery interface or displaying on a display device the suggestion of the possible matches of the similar dataset or the similar set of operations to perform to generate the similar dataset.

17. The non-transitory computer-readable media of claim 16 further comprising providing high availability for data discovery of the data at the one of the one or more storage systems in response to a query by providing a proxy layer for processing search requests to and responses from a plurality of applications under control of a central coordinator, wherein the central coordinator identifies an active leader from the applications and enables the proxy layer to forward requests to the active leader and to receive responses from the active leader.

18. The non-transitory computer-readable media of claim 15 further comprising creating, at the data service, data audits associated with the data, and pulling change events representing the data for the one or more sources at the one of the one or more storage systems.

19. The non-transitory computer-readable media of claim 15, wherein the creating the data lineage includes:
    identifying discrete processes in a data flow associated with the data;
    eliminating duplicates in the data lineage and the data catalog associated with the data by performing pattern recognition on the metadata associated with the data using the artificial intelligence to identify the duplicates in the data lineage and the data catalog associated with the data and eliminating the duplicates in the data lineage and the data catalog; and
    presenting a detailed, granular data lineage and the data catalog for usage in performing the complex data transformations.

20. The non-transitory computer-readable media of claim 15, wherein the writing the received data to the one of the one or more storage systems includes determining access rights to the one of the one or more data storage systems for writing the data to the one of the one or more storage systems.

* * * * *